United States Patent
Karimli et al.

(10) Patent No.: US 10,194,313 B1
(45) Date of Patent: Jan. 29, 2019

(54) ESIM PROFILE PROVISIONING BETWEEN PROXIMATE DEVICES

(71) Applicant: T-Mobile USA, Inc., Bellevue, WA (US)

(72) Inventors: Yasmin Karimli, Kirkland, WA (US); Ming Shan Kwok, Seattle, WA (US); Gunjan Nimbavikar, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/707,691

(22) Filed: Sep. 18, 2017

(51) Int. Cl.
*H04W 24/00* (2009.01)
*H04W 8/20* (2009.01)
*H04W 8/00* (2009.01)
*H04W 4/021* (2018.01)
*H04L 29/06* (2006.01)

(52) U.S. Cl.
CPC .......... *H04W 8/205* (2013.01); *H04W 8/005* (2013.01); *H04L 63/0853* (2013.01); *H04W 4/021* (2013.01)

(58) Field of Classification Search
CPC ..... H04W 8/205; H04W 8/005; H04W 4/021; H04L 63/0853
USPC ......................................................... 455/418
See application file for complete search history.

(56) References Cited

U.S. PATENT DOCUMENTS

| | | | |
|---|---|---|---|
| 8,774,753 B2 | 7/2014 | Jabara et al. | |
| 2007/0004457 A1* | 1/2007 | Han ........................ | H04W 8/20 455/558 |
| 2010/0015952 A1* | 1/2010 | Wood, III ............... | H04L 63/08 455/411 |
| 2012/0115542 A1* | 5/2012 | Griffin ................... | H04W 8/205 455/552.1 |
| 2014/0349706 A1* | 11/2014 | Griffin ................... | H04W 8/205 455/552.1 |
| 2016/0014601 A1* | 1/2016 | Mellqvist .............. | H04W 12/06 455/411 |
| 2016/0088467 A1* | 3/2016 | Reddem .................. | H04W 8/20 455/418 |

(Continued)

FOREIGN PATENT DOCUMENTS

| | | |
|---|---|---|
| KR | 20170082122 | 7/2017 |
| WO | WO2015080638 | 6/2015 |

(Continued)

OTHER PUBLICATIONS

The PCT Search Report and Written Opinion dated Dec. 6, 2018 for PCT Application No. PCT/US2018/047715, 14 pages.

*Primary Examiner* — Timothy Pham
(74) *Attorney, Agent, or Firm* — Lee & Hayes, P.C.

(57) ABSTRACT

Embedded subscriber identity module (eSIM) profile provisioning between proximate devices is described. In at least one example, a first device can broadcast expression data to one or more other devices. Based on determining a presence of a second device within a particular region, the first device can send a request for a profile associated with an eSIM of the second device to the second device. The second device can provision the profile to the first device via a direct connection with the first device. Based on receiving the profile from the second device, the first device can associate the profile with its eSIM and can access at least one service based at least in part on the profile.

20 Claims, 4 Drawing Sheets

(56) References Cited

U.S. PATENT DOCUMENTS

2016/0337780 A1* 11/2016 Li .......................... H04W 8/20
2017/0244837 A1*  8/2017 Kim ................... H04M 1/7253

FOREIGN PATENT DOCUMENTS

WO    WO2016048491    3/2016
WO    WO2017082697    5/2017

* cited by examiner

ESIM PROFILE PROVISIONING BETWEEN PROXIMATE DEVICES

BACKGROUND

Mobile devices can be associated with subscriber identity module (SIM) cards which store personal information of respective account holders. A SIM card can be a portable memory chip or an integrated memory chip. A SIM card associated with a mobile device can store data associated with a subscriber identity corresponding to an account holder associated with the mobile device, a phone number of the account holder, an address book of the account holder, text messages sent and received via the mobile device, and other data. Generally, when a consumer opens an account associated with a service provider, such as a telecommunication service provider, the service provider can activate a SIM card of a mobile device associated with the account. That is, each SIM card includes a unique number printed on the memory chip which requires activation by the service provider (e.g., via a website associated with the service provider, via a call to the service provider, via provisioning by the service provider, etc.). Following activation of an account by the service provider, the consumer, via the mobile device, can utilize various services offered by the service provider.

In some examples, for instance with an embedded (also called electronic or enhanced) subscriber identity module (eSIM), a profile (e.g., an eSIM profile) including a unique number (i.e., associated with a service provider) and other data (e.g., account information (e.g., subscription key, identity and/or service plan profiles, etc.), restrictions, etc.) can be downloaded by a mobile device, and no further activation is required to activate an account associated with the service provider and/or otherwise use services available from the service provider. For instance, a local profile assistant (e.g., computer-readable instructions) associated with a mobile device can download a profile from a service provider and install the profile on the mobile device. As a result, the eSIM of the mobile device can be associated with the downloaded profile provided by the service provider. General profile provisioning is defined in GSMA RSP (Remote SIM Provisioning) for consumer devices technical specification standard SGP.22, for example.

Proximity services are services that become available when a mobile device enters a specific area or nears another device. Proximity services enable device-to-device communication. That is, proximity services can enable two or more devices to communicate between one another without any network node involvement. Proximity services can be used for public safety applications, social network applications, home automation/networking applications, mobile advertisement applications, etc. Additional details associated with proximity services are described in standard 23.303 of the 3GPP specifications, for example.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

In examples of the present disclosure, device-to-device profile provisioning is described. As described above, devices can be associated with subscriber identity modules (SIMs). For the purpose of this discussion, a SIM can be associated with a card (portable memory chip or an integrated memory chip), but is referred to as a SIM throughout. SIMs store personal information of respective account holders. eSIMs are integrated into a device and can be associated with profiles that correspond to particular service providers. For the purpose of this discussion, an eSIM can refer to an embedded subscriber identity module, which can also be called an electronic subscriber identity module or an enhanced subscriber identity module. That is, an eSIM can refer to a SIM that is integrated into a device and can be provisioned with profile(s) from a remote entity (e.g., a service provider, another device, etc.).

As described above, with eSIMs, a profile (e.g., an eSIM profile) can be downloaded by a device. For the purpose of this discussion, one or more data items can collectively represent a profile. A profile can include data such as account information, service plan information, provisioning rules, etc. In at least one example, a local profile assistant (e.g., computer-readable instructions) associated with a device can download a profile via a direct connection with another device and install the profile on the device. For the purpose of this discussion, a direct connection can refer to a device-to-device connection (such as provided via proximity services described in standard 23.303 of the 3GPP specifications or the like). As a result of the local profile assistant downloading the profile, the eSIM of the device can be associated with the downloaded profile and the device can access particular services.

Techniques described herein are directed to eSIM profile provisioning between proximate devices. In at least one example, a first device can detect a presence of a second device within a threshold distance of the first device and/or within a predefined geolocation. Based on detecting the presence of the second device, the first device and the second device can establish a direct connection and the first device can provision the profile to the second device via the direct connection. That is, the profile can be provisioned via device-to-device communication (e.g., without any network node involvement). By provisioning the profile to the second device, the second device can associate the profile with its eSIM and can access services utilizing the profile. In at least one example, the profile can be temporarily provisioned to the second device. That is, in at least one example, the profile can be associated with provisioning rules that indicate when to end the temporary provisioning.

In a non-limiting example, a first device can be associated with a profile of a first service provider and a second device can be associated with a profile of a second service provider. In a particular geolocation, the signal associated with the second service provider can be stronger than the signal associated with the first service provider. The first device and/or the second device can broadcast expression data to one or more other devices. The expression data can indicate an identity of a device, a service associated with the device, an interest of the device (or its operator) (e.g., user A is looking for a tennis partner, user B is an avid tennis player, etc.), a location of the device, etc. Based on the expression data, the first device can determine that the second device is within a threshold distance of the first device and/or is within a predefined geolocation. To obtain the benefit of the stronger signal, the first device can request that the second device provision its profile to the first device. A direct connection between the first device and the second device can be established and the second device can provision its profile to the first device. The first device can associate the profile with its eSIM and can temporarily access services provided by the second service provider. That is, based on the second device provisioning the profile to the first device, the first device can temporarily access the stronger signal of the second service provider. The access can be terminated based on one or more provisioning rules, as described herein.

In another non-limiting example, a first device can be associated with a first profile and a second device can be associated with a second profile. The first profile and the second profile can be associated with a same service provider or different service providers. In at least one example, an operator of the first device can desire to utilize secure payment services associated with the second device. In such an example, to successfully complete a transaction, a payment application accesses a profile of an eSIM for authentication. As described above, in an example, the first device and/or the second device can broadcast expression data to one or more other devices. Based on the expression data, the first device can determine that the second device is within a threshold distance of the first device and/or is within a predefined geolocation. To utilize the secure payment services, the first device can request that the second device provision its profile (e.g., the second profile) to the first device. A direct connection between the first device and the second device can be established and the second device can provision the second profile to the first device. The first device can associate the second profile with its eSIM and can temporarily utilize the second profile in association with secure payment services. That is, based on the second device provisioning the profile to the first device, the first device can temporarily access the second profile for use with the secure payment services. A same and/or similar provisioning process can be utilized for enabling access to other secure services (e.g., secure email, etc.).

Techniques described above are directed to provisioning a profile to a proximate device via device-to-device communication. While the aforementioned description is directed to peer-to-peer profile provisioning, in some examples, a single device can provision its profile, or a portion of its profile, to more than one other device. That is, techniques described herein can be directed to a single device provisioning a profile to one or more proximate devices (e.g., one-to-one or one-to-many).

Techniques described herein are directed to various improvements over conventional computer-related technologies. For instance, techniques described herein are directed to customizing and/or configuring profile(s) that are provisioned via direct connections between two or more devices. That is, the techniques described herein are directed to enabling device(s) to provision a profile associated with its eSIM to other device(s) to avail services that were not previously available to the other device(s) per the profile(s) associated with the other device(s). For instance, techniques described herein enable proximate device(s) to extend certain eSIM-level profile characteristics laterally (e.g., to other peer device(s)) to enable the peer device(s) to access telecommunication services, secure services (e.g., secure payment services, secure email services, etc.), etc.

Figure 1:
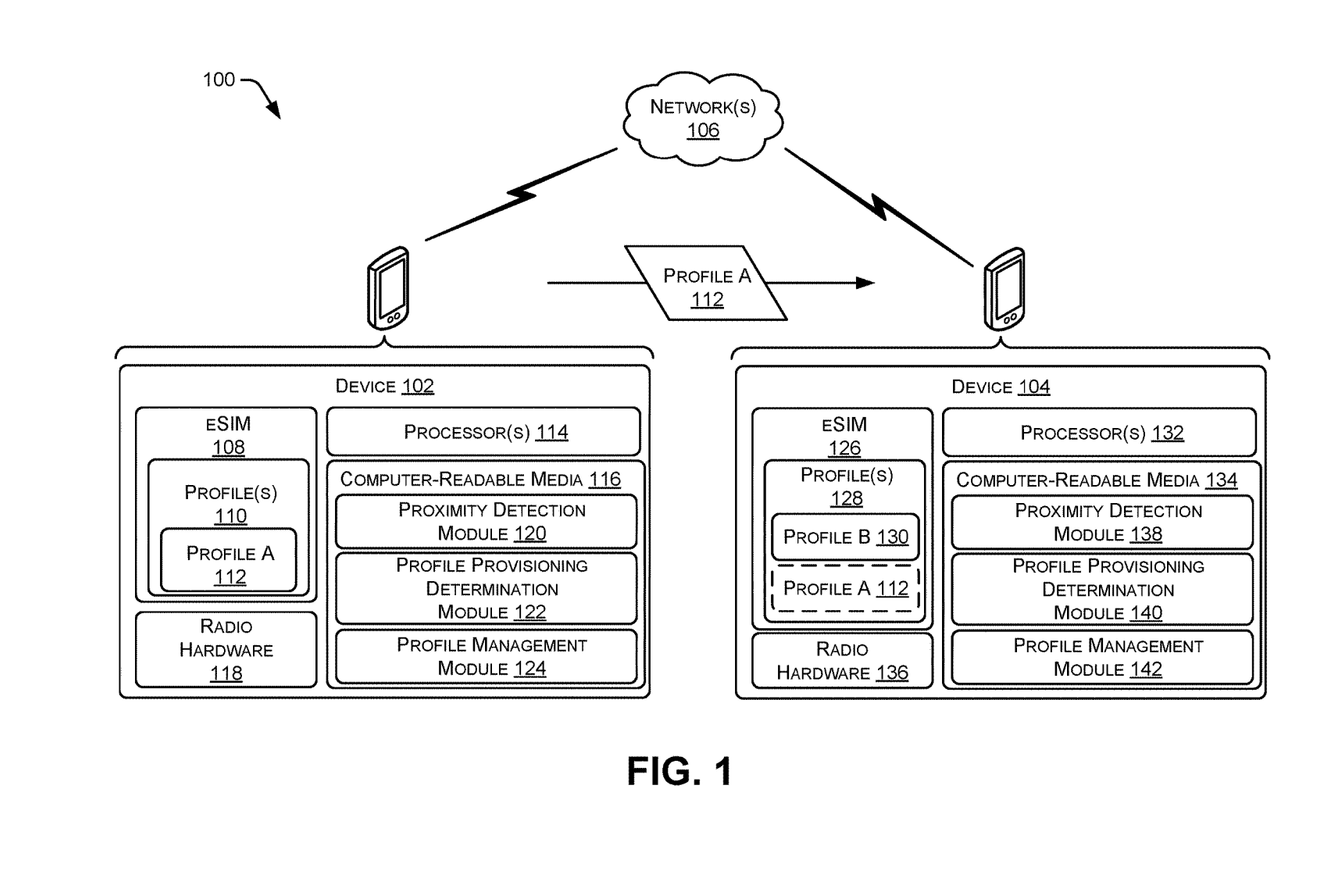
FIG. 1 illustrates an environment for provisioning access to a service provider via profile management.

FIG. 1 illustrates an environment 100 for provisioning a profile to a proximate device via device-to-device communication. Environment 100 includes a first device 102 and a second device 104, although any number of devices can be included in the environment. The first device 102 and the second device 104 can communicate via one or more networks 106 (e.g., cellular network(s), the Internet, other networks (e.g., wide area network (WAN), local area network (LAN), wi-fi, Bluetooth®, etc.)).

The first device 102 can correspond to user equipment (UE) including, but not limited to, a smart phone, a personal digital assistant, a netbook, a laptop computer, a smart appliance, and/or another electronic device that is capable of sending or receiving voice, video, and/or data via the network(s) 106. In at least one example, the first device 102 can include an eSIM 108, which can be an integrated memory chip, as described above. The eSIM 108 can store personal information of a user, such as, but not limited to, data associated with a phone number of a user associated with the first device 102, an address book of the user, text messages sent and received via the first device 102, and other data. In at least one example, the eSIM 108 can be associated with an identifier. The identifier can be a unique code that is particular to the eSIM 108. That is, the identifier can uniquely identify the eSIM 108 that is associated with the first device 102. In at least one example, the identifier can be an eUICC-ID (e.g., eID).

In at least one example, the eSIM 108 can be associated with profile(s) 110. In at least one example, a profile of the profile(s) 110 can indicate which service plans, services, functionalities, etc. are available for the first device 102 from a particular service provider. For instance, a user (e.g., an operator and/or an account holder) can operate the first device 102. The user can be an entity (e.g., person, company, etc.) that subscribes to services, such as telecommunication services, via a service plan. The service plan can indicate an amount of data, voice calling, and/or text messaging available to the first device 102, whether data, voice calling, and/or text messaging is available internationally, data transmission speeds accessible to the first device 102, etc. In at least one example, particulars of the service plan can be indicated in a profile of the profile(s) 110.

In addition to including data associated with service plan particulars, a profile of the profile(s) 110 can include data associated with one or more provisioning rules. The one or more provisioning rules can indicate when temporary access to the profile is to be terminated. The one or more provisioning rules can be time-based, transaction-based, location-based, metric-based, etc.

For instance, in at least one example, a provisioning rule can indicate a length of time that the profile is to be accessible. That is, after a lapse of a period of time equal to the length of time, access to the profile can be terminated, as described below. Moreover, in an additional and/or alternative example, a provisioning rule can indicate a geographic area within which the profile is to be accessible. That is, based on determining that the first device 102 is not located within the geographic area, access to the profile can be terminated, as described below. In an additional and/or alternative example, a provisioning rule can indicate an amount of data that can be consumed in association with the profile. That is, after the amount of data is consumed, access to the profile can be terminated, as described below. Moreover, in at least one example, a provisioning rule can indicate a number of times the profile can be accessed and/or used. That is, after the profile is accessed and/or used more than a predetermined number of times, access to the profile can be terminated, as described below. Additional and/or alternative provisioning rules can be imagined.

The first device 102 can include processor(s) 114, computer-readable media 116, and radio hardware 118. The processor(s) 114 can represent, for example, a central processing unit (CPU)-type processing unit, a graphics processing unit (GPU)-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc. In at least one example, an accelerator can represent a hybrid device, such as one from ZYLEX or ALTERA that includes a CPU course embedded in an FPGA fabric. In various embodiments, the processor(s) 114 can execute one or more modules and/or processes to cause the first device 102 to perform a variety of functionalities, as set forth above and explained in further detail in the following disclosure. Additionally, each of the processor(s) 114 can possess its own local memory, which also can store program modules, program data, and/or one or more operating systems.

Depending on the exact configuration and type of the first device 102, the computer-readable media 116, can include computer storage media and/or communication media.

Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In at least one example, the computer storage media can include non-transitory computer-readable media. Non-transitory computer-readable media can include volatile and nonvolatile, removable and non-removable tangible, physical media implemented in technology for storage of information, such as computer readable instructions, data structures, program modules, or other data. The computer-readable media 116 is an example of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information and which can be accessed by the first device 102. Any such non-transitory computer-readable media can be part of the first device 102.

In contrast, communication media includes computer readable instructions, data structures, program modules, or other data in a modulated data signal, such as a carrier wave, or other transmission mechanism. As defined herein, computer storage media does not include communication media.

The computer-readable media 116 can include one or more modules and data structures including, for example, a proximity detection module 120, a profile provisioning determination module 122, and a profile management module 124. The one or more modules and data structures can be in the form of stand-alone applications, productivity applications, an operating system component, or any other application or software module configured to facilitate the provisioning of profile(s), as described herein. In some examples, one or more of the modules can be combined into a single module.

The proximity detection module 120 can facilitate the determination of one or more devices that are within a particular region. In at least one example, the particular region can be a threshold distance from the first device 102. In an additional and/or alternative example, the particular region can be a predefined geolocation defined by a geofence, for example. In at least one example, a device that is within the particular region (e.g., within a threshold distance of the first device 102 and/or within a predetermined geographic area), can be proximate to the first device 102. For the purpose of this discussion, the second device 104 is proximate to the first device 102. That is, the first device 102 and the second device 104 are proximate devices.

The proximity detection module 120 can send and/or receive expression data. As described above, expression data can indicate an identity of a device, a service associated with the device, an interest of the device (or its operator), a location of the device, etc. In at least one example, expression data can include one or more identifiers indicating an identity of a device, a service associated with the device, an interest of the device (or its operator), a location of the device, etc. The proximity detection module 120 can send expression data associated with the first device 102 to one or more other devices (e.g., the second device 104, etc.).

Additionally, the proximity detection module 120 can receive expression data from other devices (e.g., the second device 104) and can determine whether any of the other devices are proximate to the first device 102. That is, the proximity detection module 120 can process expression data associated with other device(s) to determine whether the other device(s) are within the particular region. Additional details associated with locating proximate devices, via proximity services, for example, are described in standard 23.303 of the 3GPP specifications. In at least one example, responsive to determining that another device is within the particular region, the proximity detection module 120 can send an indication to the other device alerting it to its proximity to the first device 102.

In at least one example, a user of the first device 102 can interact with the first device 102 to activate the functionality described above with respect to the proximity detection module 120. That is, in such an example, the user can interact with an application (e.g., via a graphical user interface, etc.) to activate proximity services that can be implemented by the proximity detection module 120. In such an example, the proximity detection module 120 can transmit expression data responsive to the activation.

In an additional and/or alternative example, the profile provisioning determination module 122 can determine an occurrence of an event. Based at least in part on the occurrence of the event, the proximity detection module 122 can transmit expression data. In at least one example, the event can correspond to a signal strength below a threshold. For instance, if the signal strength associated with telecommunication services provided by a service provider drops below a threshold, the proximity detection module 122 can output expression data indicating that the first device 102 desires to access a profile associated with another service provider that has a stronger signal strength. That is, in such an example, the proximity detection module 122 can transmit expression data including, but not limited to, an identifier associated with a location and an identifier associated with an interest (e.g., acquiring a profile associated with a service provider that has a signal strength above a threshold). In an additional and/or alternative example, the event can correspond to an indication that a user desires to use a profile of another user to access secure services, such as secure payment services, secure email services, etc. Responsive to such an indication, the proximity detection module 122 can output expression data indicating that the first device 102 desires to access a profile associated with another device to enable access to particular secure services. That is, in such an example, the proximity detection module 122 can transmit expression data including, but not limited to, an identifier associated with a location and an identifier associated with an interest (e.g., accessing a profile associated with another device to enable access to particular secure services).

In some examples, the profile provisioning determination module 122 can transmit expression data passively (e.g., without requiring a determination of an occurrence of an event, etc.).

In at least one example, the proximity detection module 120 can receive expression data, as described above. In at least one example, the proximity detection module 120 can analyze received expression data to identify expression data that is relevant to the first device 102. For instance, in at least one example, the proximity detection module 120 can analyze received expression data to determine whether a device is within a particular region, as described above. Additionally and/or alternatively, if another device is looking for a profile associated with a particular service provider (as indicated in expression data), the proximity detection module 120 can analyze the expression data to determine whether a profile of the profile(s) 110 is associated with the particular service provider. Based at least in part on determining that a profile of the profile(s) 110 is associated with the particular service provider, the proximity detection module 120 can provide an indication to the other device that it is associated with such a profile.

The profile provisioning determination module 122 can determine when to provision a profile to another device and/or which device to provision the profile. In at least one example, the profile provisioning determination module 122 can access expression data associated with other device(s) to determine whether the other device(s) desire to receive a profile from the first device 102 and/or are capable of provisioning a profile to the first device 102. In some examples, expression data can indicate another device's interest in acquiring a profile from another device. In additional and/or alternative examples, the profile provisioning determination module 122 can receive a request from another device. The other device can send a request for a profile associated with the first device 102 (e.g., Profile A 112). Based at least in part on receiving the request, the profile provisioning determination module 122 can send an instruction to the profile management module 124 to provision the profile to the other device. In at least one example, a request can be associated with expression data. In some examples, the profile provisioning determination module 122 can determine to provision a profile to another device without receiving a request.

The profile management module 124 can facilitate the transmission and/or reception of profile(s) 110. As described above, a profile can be one or more data items that collectively represent the profile. In at least one example, the profile management module 124 can perform the same or similar functions as the local profile assistant described above.

In at least one example, responsive to receiving an instruction to provision a profile to another device (e.g., the second device 104), the profile management module 124 can generate a direct connection with the other device. That is, the profile management module 124 can establish a device-to-device connection with the other device. As described above, the device-to-device connection can be without any network node involvement. In some examples, the device-to-device connection can be a secure connection established by an exchange of device credentials. Based at least in part on the establishment of the direct connection, the profile management module 124 can transmit a profile (e.g., Profile A 112) to the other device via the direct connection. In at least one example, the profile management module 124 can provide an access code to the other device to establish a secure channel for transmitting the profile. In other examples, the profile management module 124 can directly provision the profile to the other device without first providing an access code. In at least one example, the profile management module 124 can refrain from provisioning the profile until the profile management module 124 receives an indication that the user of the first device 102 and/or the user of the second device 104 authorize the provisioning.

In at least one example, the first device 102 can receive a profile from another device. That is, another device can send a profile via a direct connection established between the devices. In at least one example, upon receiving the profile, the profile management module 124 can associate the profile with the eSIM 108. That is, in at least one example, the profile management module 124 can install the profile. In some examples, the profile management module 124 can send an installation result (e.g., success, failure, etc.) to the other device.

Moreover, in at least one example, the profile management module 124 can determine when access to a profile that has been temporarily provisioned to a device is to be terminated. As described above, in at least one example, profile(s) 110 can be associated with one or more provisioning rules. The provisioning rule(s) can indicate when access to a profile that has been temporarily provisioned to a device is to be terminated. As described above, the one or more provisioning rules can be time-based, transaction-based, location-based, metric-based, etc. Based at least in part on determining that a provisioning rule indicates that access to a temporarily provisioned profile is to be terminated, the profile management module 124 can terminate the access to the profile. That is, the profile management module 124 can uninstall the profile or activate another profile instead of the profile.

The radio hardware 118 provides wireless UE capabilities, such as connecting to a base station, a Wi-Fi network, or other wireless networks. The radio hardware 118 can include or be incorporated into processors, ASICs, programmable circuits such as FPGAs, or in other ways.

As described above, the first device 102 can communicate with a second device 104 to provision a profile (e.g., Profile A 112) to the second device 104. The second device 104 can correspond to UE including, but not limited to, a smart phone, a personal digital assistant, a netbook, a laptop computer, a smart appliance, and/or another electronic device that is capable of sending or receiving voice, video, and/or data via the network(s) 106. In at least one example, the second device 104 can include an eSIM 126, which can be an integrated memory chip, as described above. The eSIM 126 can store personal information of a user, such as, but not limited to, data associated with a phone number of a user associated with the second device 104, an address book of the user, text messages sent and received via the second device 104, and other data. In at least one example, the eSIM 126 can be associated with an identifier. The identifier can be a unique code that is particular to the eSIM 126. That is, the identifier can uniquely identify the eSIM 126 that is associated with the second device 104. In at least one example, the identifier can be an eUICC-ID (e.g., eID). For the purpose of illustration, eSIM 108 and eSIM 126 can be associated with different identifiers.

In at least one example, the eSIM 126 can be associated with profile(s) 128. In at least one example, a profile of the profile(s) 128 can indicate which service plans, services, functionalities, etc. are available for the second device 104 from a particular service provider. For instance, a user (e.g., an operator and/or an account holder) can operate the second device 104. The user can be an entity (e.g., person, company, etc.) that subscribes to services, such as telecommunication services, via a service plan. The service plan can indicate an amount of data, voice calling, and/or text messaging available to the second device 104, whether data, voice calling, and/or text messaging is available internationally, data transmission speeds accessible to the second device 104, etc. In at least one example, particulars of the service plan can be indicated in a profile of the profile(s) 128. In addition to including data associated with service plan particulars, a profile of the profile(s) 128 can include data associated with one or more provisioning rules. The one or more provisioning rules can indicate when temporary access to a provisioned profile is to be terminated, as described above. For the purpose of this discussion, the second device 104 is associated with Profile B 130.

The second device 104 can include processor(s) 132, computer-readable media 134, and radio hardware 136. The processor(s) 132 can have same or similar structure and/or function as the processor(s) 114 described above. The computer-readable media 134 can have same or similar structure and/or function as the computer-readable media 116 described above. The radio hardware 136 can have same or similar structure and/or function as the radio hardware 118 described above The computer-readable media 134 can include one or more modules and data structures including, for example, a proximity detection module 138, a profile provisioning determination module 140, and a profile management module 142. The one or more modules and data structures can be in the form of stand-alone applications, productivity applications, an operating system component, or any other application or software module configured to facilitate the transmission of profile(s) between proximate devices, as described herein. In some examples, one or more of the modules can be combined into a single module.

The proximity detection module 138 can have the same or similar structure and/or function as the proximity detection module 120. The profile provisioning determination module 140 can have the same or similar structure and/or function as the profile provisioning determination module 122. The profile management module 142 can have the same or similar structure and/or function as the profile management module 124.

In at least one example, the proximity detection module 120 and the proximity detection module 138 can broadcast expression data associated with the first device 102 and the second device 104, respectively. Based at least in part on the expression data, the proximity detection module 120 and the proximity detection module 138 can determine that the first device 102 and the second device 104 are proximate devices. In at least one example, the first device 102 can be associated with a same service provider as the second device 104, can be a contact in a contact list associated with the second device 104, can be associated with an account that shares one or more interests as an account associated with the second device 104, etc.

Based on determining that the second device 104 is proximate to the first device 102, the profile provisioning determination module 122 can determine to temporarily provision Profile A 112 to the second device 104. In some examples, the second device 104 can send a request for the profile and the profile provisioning determination module 122 can determine to temporarily provision Profile A 112 to the second device 104 based at least in part on the request. In at least one example, the profile management module 124 and/or the profile management module 142 can establish a direct connection between the first device 102 and the second device 104. The profile management module 124 can transmit the profile to the profile management module 142 via the direct connection.

The profile management module 142 can receive the profile (e.g., Profile A 112) and can associate the profile with the eSIM 126. That is, the profile management module 142 can download the profile and install the profile on the second device 104. Profile A 112 is shown in dashed lines as a profile that is being temporarily provisioned to the second device 104. As a result, the second device 104 can access one or more services utilizing the profile (e.g., Profile A 112) until the profile management module 142 determines that the temporary provisioning is to be terminated (per one or more provisioning rules associated with Profile A 112). As described above, the one or more services can include telecommunication services, secure services (e.g., secure payment services, secure email services, etc.), etc. In at least one example, the second device 104 can be temporarily provisioned a secure identity associated with the profile (e.g., Profile A 112), which can be used for accessing the one or more services.

Figure 2:
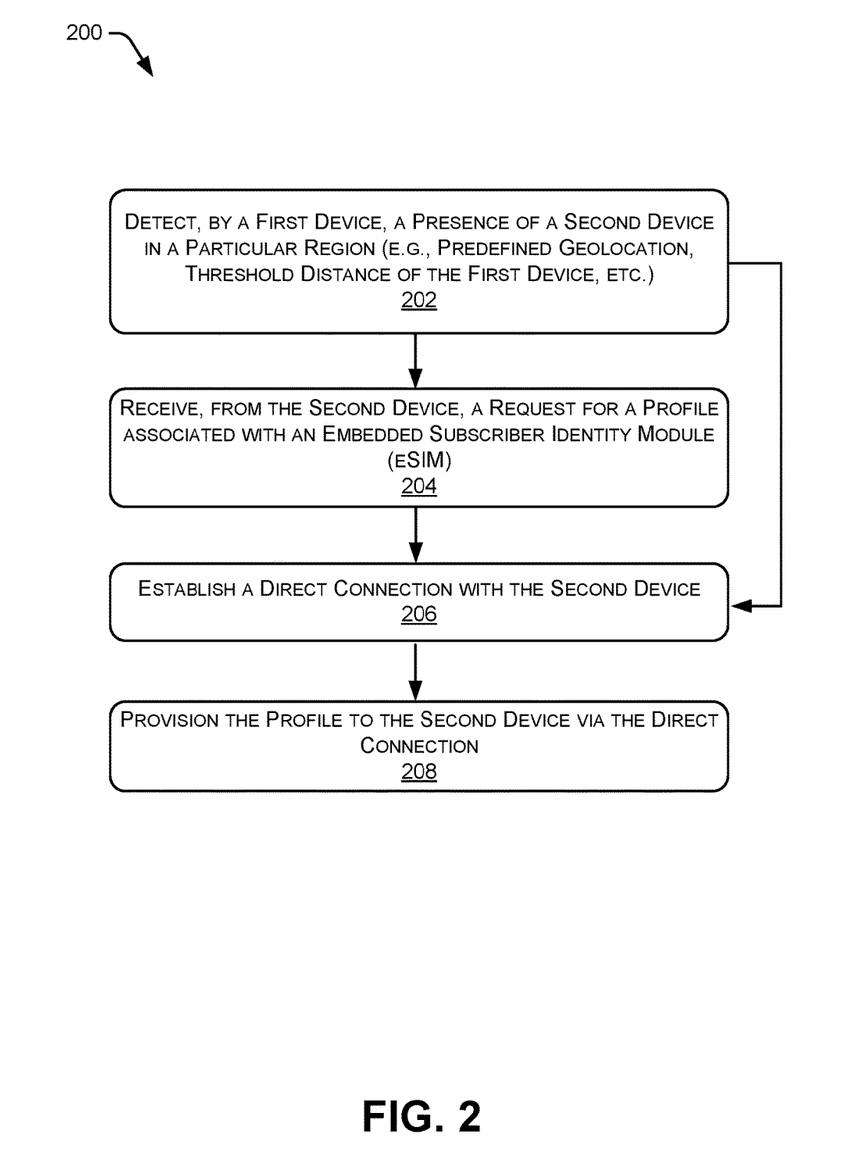
FIG. 2 illustrates an example process for provisioning, from a first device, a profile to a second device via a direct connection between the first device and the second device.
Figure 3:
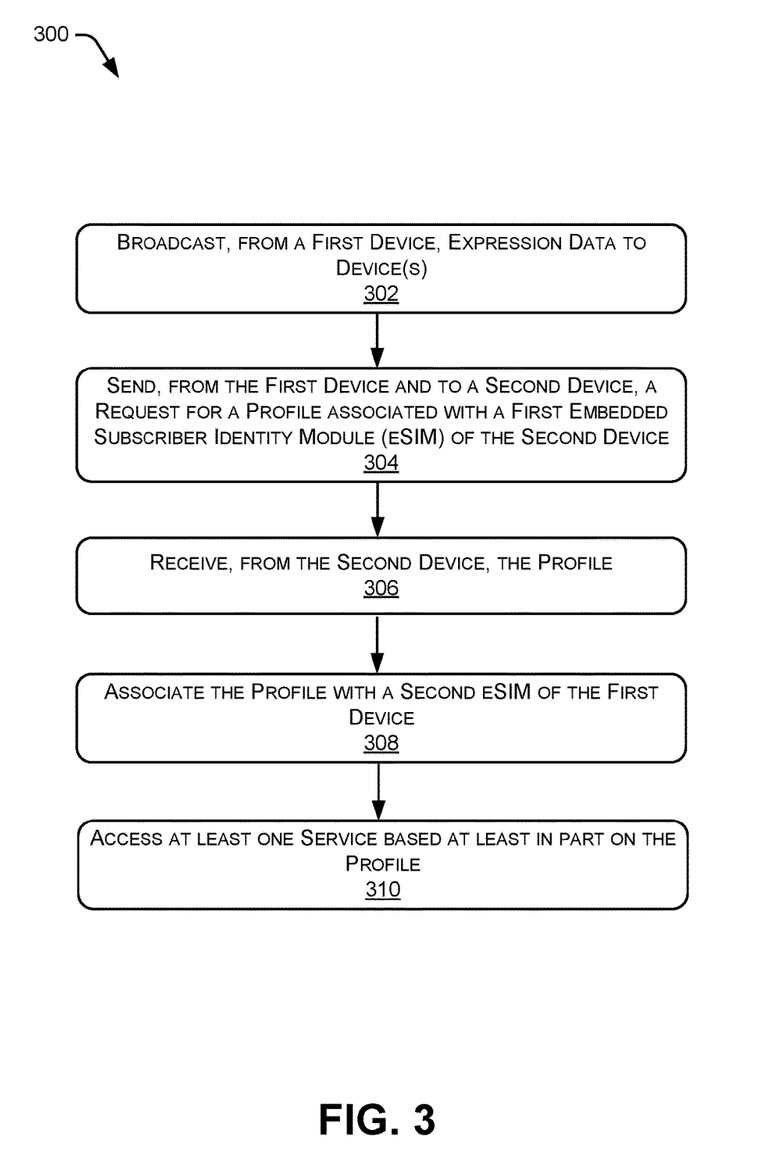
FIG. 3 illustrates an example process for receiving, at a first device, a profile from a second device via a direct connection between the first device and the second device and utilizing the profile to access at least one service.
Figure 4:
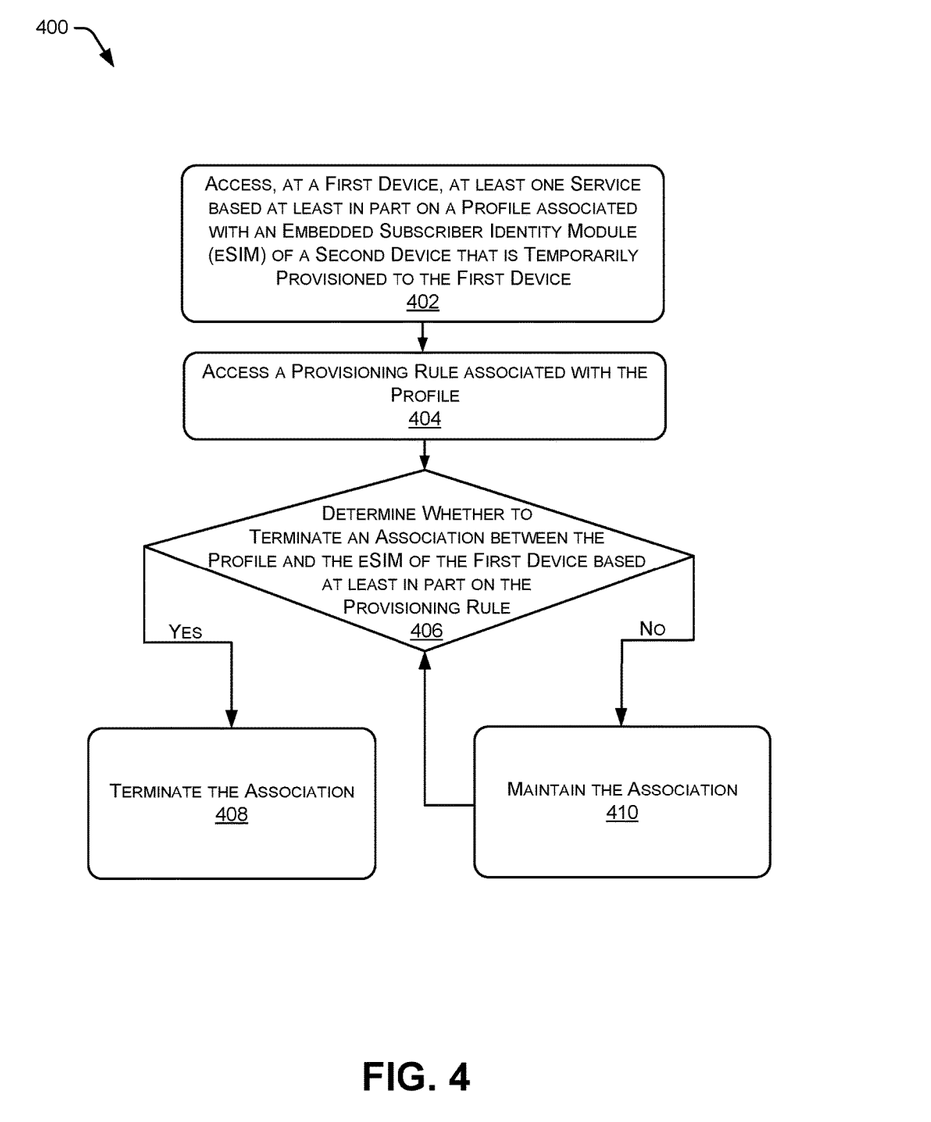
FIG. 4 illustrates an example process for determining when to terminate an association between a temporarily provisioned profile and an eSIM of a device.

FIGS. 2-4 describe example processes for facilitating device-to-device provisioning of eSIM profiles. The example processes are described in the context of the environments of FIG. 1, but are not limited to that environment.

The processes described below in association with FIGS. 2-4 can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functionalities or implement particular abstract data types. In other embodiments, hardware components perform one or more of the operations. Such hardware components can include or be incorporated into processors, ASICs, programmable circuits such as FPGAs, or in other ways. The order in which the operations are described is not intended to be construed as a limitation, and any number of the described operations can be combined in any order and/or in parallel to implement the processes.

FIG. 2 illustrates an example process 200 for provisioning, from a first device, a profile to a second device via a direct connection between the first device and the second device.

Block 202 illustrates detecting, by a first device, a presence of a second device in a particular region (e.g., predefined geolocation, threshold distance of the first device, etc.). As described above, the proximity detection module 120 (associated with the first device 102) can receive expression data from other devices (e.g., the second device 104) and can determine whether any of the other devices are proximate to the first device 102. That is, the proximity detection module 120 can process expression data associated with other device(s) to determine whether the other device(s) are within the particular region. Additional details associated with locating proximate devices, via proximity services, for example, are described in standard 23.303 of the 3GPP specifications.

In at least one example, the proximity detection module 120 can receive expression data from the second device 104. The expression data can indicate at least a location associated with the second device 104. The proximity detection module 120 can analyze the expression data to determine the location of the second device 104. In at least one example, the proximity detection module 120 can determine whether the location of the second device 104 is within a threshold distance of the first device 102. The threshold distance can be a configurable distance. In at least one example, the threshold distance can correspond to a distance within which a direct connection can be established.

In an additional and/or alternative example, the proximity detection module 120 can determine whether the location of the second device 104 is within a predefined geolocation, which can be defined by a geofence. That is, the proximity detection module 120 can analyze the expression data to determine the location of the second device 104 and determine whether the location is within the geofence.

In at least one example, responsive to determining that the second device 104 is within the particular region, the proximity detection module 120 can send an indication to the second device 104 alerting it to its proximity to the first device 102.

Block 204 illustrates receiving, from the second device, a request for a profile with an eSIM. In at least one example, the profile provisioning determination module 122 can receive a request for a profile from the second device 104. In some examples, the request can be responsive to the indication that the second device 104 is proximate to the first device 102. Based at least in part on receiving the request, the profile provisioning determination module 122 can send an instruction to the profile management module 124 to provision the profile to the second device 102.

In at least one example, the profile provisioning determination module 122 can determine to send a profile to the second device 104 without receiving a request first. In such an example, process 200 can proceed directly to block 206.

Block 206 illustrates establishing a direct connection with the second device. As described above, in at least one example, responsive to receiving an instruction to provision a profile to another device (e.g., the second device 104), the profile management module 124 can generate a direct connection with the other device. That is, the profile management module 124 can establish a device-to-device connection between the first device 102 and the second device 104. As described above, the device-to-device connection can be without any network node involvement. In some examples, the device-to-device connection can be a secure connection established by an exchange of device credentials.

Block 208 illustrates provisioning the profile to the second device via the direct connection. Based at least in part on the establishment of the direct connection, the profile management module 124 can transmit a profile to the second device 104 via the direct connection. In at least one example, the profile management module 124 can provide an access code to the second device 104 to establish a secure channel for transmitting the profile. In other examples, the profile management module 124 can directly provision the profile to the second device 104 without first providing an access code. In at least one example, the profile management module 124 can refrain from provisioning the profile until the profile management module 124 receives an indication that the user of the first device 102 and/or the user of the second device 104 authorize the provisioning.

Based at least in part on provisioning the profile to the second device 104, the second device 104 can associate the profile with its eSIM 128 temporarily (until provisioning rule(s) indicate the association is to be terminated).

While process 200 is described above with respect to peer-to-peer profile provisioning (e.g., a first device provisioning a profile to a second device), in some examples, a single device (e.g., the first device 102) can provision its profile, or a portion of its profile, to more than one other device, as described above. That is, in some examples, the first device 102 can provision its profile to the second device 104 and one or more other devices. In such an example, the profile associated with the first device 102 can be a root profile that can be provisioned to one or more other devices that can inherit one or more profile characteristics of the root profile. That is, in such an example, each of the devices provisioned with a profile from the first device 102 can be associated with a same identity with which each device can use to access particular service(s) temporarily (until provisioning rule(s) indicate the access is to be terminated).

FIG. 3 illustrates an example process 300 for receiving, at a first device, a profile from a second device via a direct connection between the first device and the second device and utilizing the profile to access at least one service.

Block 302 illustrates broadcasting, from a first device, expression data to device(s). As described above, the proximity detection module 120 can send expression data. The proximity detection module 120 can send expression data associated with the first device 102 to one or more other devices (e.g., the second device 104, etc.).

In at least one example, a user of the first device 102 can interact with the first device 102 to activate the functionality described above with respect to the proximity detection module 120. That is, in such an example, the user can interact with an application (e.g., via a graphical user interface, etc.) to activate proximity services that can be implemented by the proximity detection module 120. In such an example, the proximity detection module 120 can transmit expression data responsive to the activation.

In an additional and/or alternative example, the profile provisioning determination module 122 can determine an occurrence of an event. Based at least in part on the occurrence of the event, the proximity detection module 122 can transmit expression data. In at least one example, the event can correspond to a signal strength below a threshold. In an additional and/or alternative example, the event can correspond to an indication that a user desires to use a profile of another user to access secure services, such as secure payment services, secure email services, etc.

In some examples, the profile provisioning determination module 122 can transmit expression data passively (e.g., without requiring a determination of an occurrence of an event, etc.).

Block 304 illustrates sending, from the first device to a second device, a request for a profile associated with a first eSIM of the second device. In at least one example, the first device 102 can send a request to a second device 104 for a profile associated with the eSIM 126 of the second device 104. In some examples, the request can be responsive to an indication that the second device 104 is proximate to the first device 102. In other examples, the request can be a data item of expression data broadcast by the first device 102.

Block 306 illustrates receiving, from the second device, the profile. In at least one example, the first device 102 and/or the second device 104 can establish a direct connection between the devices for transmitting the profile from the second device 104 to the first device 102. In such an example, the profile management module 142 can provision the profile from the second device 104 to the profile management module 124 of the first device 102.

Block 308 illustrates associating the profile with the second eSIM of the first device. In at least one example, upon receiving the profile, the profile management module 124 can associate the profile with the eSIM 108. That is, in at least one example, the profile management module 124 can install the profile. In some examples, the profile management module 124 can send an installation result (e.g., success, failure, etc.) to the other device.

Block 310 illustrates accessing at least one service based at least in part on the profile. Based at least in part on associating the profile with the eSIM 108 of the first device 102, the first device 102 can access at least one service using the profile. For instance, as described above the first device 102 can utilize the profile for accessing services from a telecommunication service provider, services associated with a secure payment application, services associated with a secure email application, services associated with other secure applications, etc.

FIG. 4 illustrates an example process 400 for determining when to terminate an association between a temporarily provisioned profile and an eSIM of a device. As described above, in at least one example, the profile can be temporarily provisioned to the second device. That is, in at least one example, the profile can be associated with provisioning rules that indicate when to end the temporary provisioning. The provisioning rules can be time-based, transaction-based, location-based, metric-based, etc.

Block 402 illustrates accessing, at a first device, at least one service based at least in part on a profile associated with an eSIM of a second device that is temporarily provisioned to the first device. As described above, devices can provision profiles to other devices via a device-to-device connection. In an example, a first device 102 can receive a profile associated with an eSIM 126 of a second device 104. The first device 102 can associate the profile with its eSIM 108 and can access one or more services utilizing the provisioned profile.

Block 404 illustrates accessing a provisioning rule associated with the profile. As described below, a profile can be associated with information about a service plan, account information, and/or provisioning rules. The one or more provisioning rules can indicate when temporary access to the profile is to be terminated. In at least one example, a provisioning rule can indicate a length of time that the profile is to be accessible. That is, after a lapse of a period of time equal to the length of time, access to the profile can be terminated, as described below. Moreover, in an additional and/or alternative example, a provisioning rule can indicate a geographic area within which the profile is to be accessible. That is, based on determining that the first device 102 is not located within the geographic area, access to the profile can be terminated, as described below. In an additional and/or alternative example, a provisioning rule can indicate an amount of data that can be consumed in association with the profile. That is, after the amount of data is consumed, access to the profile can be terminated, as described below. Moreover, in at least one example, a provisioning rule can indicate a number of times the profile can be accessed and/or used. That is, after the profile is accessed and/or used more than a predetermined number of times, access to the profile can be terminated, as described below. Additional and/or alternative provisioning rules can be imagined.

Block 406 illustrates determining whether to terminate an association between the profile and the eSIM of the device based at least in part on the provisioning rule. In at least one example, the profile management module 124 can determine when access to a profile that has been temporarily provisioned to a device is to be terminated. For instance, the profile management module 124 can access the profile and access a provisioning rule associated with the profile. The profile management module 124 can analyze the provisioning rule to determine whether the first device 102 is complying with the rule. For instance, the profile management module 124 can determine whether the first device 102 has used the profile for more than the length of time permitted per a provisioning rule. Or, in an additional and/or alternative example, the profile management module 124 can determine whether the first device 102 is located within a geographic area within which the profile is to be accessible per a provisioning rule. In an additional and/or alternative example, the profile management module 124 can determine whether the first device 102 has consumed more than an amount of data than is permitted to be consumed in association with the profile per a provisioning rule. Additional and/or alternative provisioning rules can be imagined.

Based at least in part on determining to terminate the association, the profile management module 124 can terminate the association, as illustrated in block 408. Based at least in part on determining that a provisioning rule indicates that access to a temporarily provisioned profile is to be terminated, the profile management module 124 can terminate the access to the profile. That is, the profile management module 124 can uninstall the profile or activate another profile instead of the profile.

As an example, a provisioning rule can indicate a length of time that the profile is to be accessible. The profile management module 124 can determine that an amount of time equal to the length of time has lapsed and can terminate access to the profile. Moreover, in an additional and/or alternative example, a provisioning rule can indicate a geographic area within which the profile is to be accessible. The profile management module 124 can determine that the first device 102 is not located within the geographic area and can terminate access to the profile. In an additional and/or alternative example, a provisioning rule can indicate an amount of data that can be consumed in association with the profile. The profile management module 124 can determine that at least the amount of data has been consumed and can determine terminate access to the profile. Or, the profile management module 124 can determine that the profile has been accessed and/or used more than a predetermined number of times, and can determine to terminate access to the profile.

Based at least in part on determining not to terminate the association, the profile management module 124 can maintain the association, as illustrated in block 410. So long as the profile management module 124 determines that the association need not be terminated per the provisioning rule(s), the profile management module 124 can refrain from terminating the association between the profile and the eSIM 108. Process 400 can return to block 406 and an association can be maintained until the profile management module 124 determines that the association is to be terminated per the provisioning rule(s).

Although the subject matter has been described in language specific to structural data items and/or methodological acts, it is to be understood that the subject matter defined in the appended claims is not necessarily limited to the specific data items or acts described. Rather, the specific data items and acts are disclosed as exemplary forms of implementing the claims.

The invention claimed is:

1. A first device comprising:
one or more processors; and
a non-transitory storage medium storing one or more instructions, the one or more instructions executable on the one or more processors to cause the first device to:
detect, as a detected presence, a presence of a second device within a configurable threshold distance of the first device, wherein the configurable threshold distance corresponds to a distance within which a device-to-device connection between the first device and the second device can be established;
send an indication to the second device, the indication indicating that the second device is within the configurable threshold distance of the first device; and
provision, based at least in part on the detected presence and via a device-to-device connection, a profile associated with a service provider and associated with an embedded subscriber identity module (eSIM) of the first device to the second device to enable the second device to utilize the profile associated with the eSIM for at least one service of a service provider, wherein the profile is embedded in the eSIM of the first device.

2. The first device as claim 1 recites, wherein the one or more instructions are further executable to:
receive expression data from the second device, the expression data including location data identifying a location of the second device; and
analyze the expression data to determine that the second device is within the threshold distance of the first device.

3. The first device as claim 1 recites, wherein the one or more instructions are further executable to:
receive, from the second device, a request for the profile; and
provision the profile responsive to the request.

4. The first device as claim 1 recites, wherein the profile is associated with a provisioning rule indicating when access to the profile is to be terminated.

5. The first device as claim 1 recites, wherein the one or more instructions are further executable to provision the profile to at least a third device to enable the third device to utilize the profile for at least one service.

6. One or more non-transitory computer-readable storage media storing computer-executable instructions that, when executed by one or more processors, perform acts comprising:
broadcast, from a first device, expression data to one or more other devices including a second device;
send, from the first device to the second device, a request for a profile associated with a first embedded subscriber identity module (eSIM) of the second device;
receive, by the first device and from the second device, the profile;
store the profile in the first device;
associate the profile with a second eSIM of the first device; and
access at least one service of a service provider based at least in part on the profile.

7. The one or more non-transitory computer-readable storage media as claim 6 recites, wherein, based at least in part on broadcasting the expression data, the one or more instructions are executable by the one or more processors further to determine a presence of the second device within a threshold distance of the first device.

8. The one or more non-transitory computer-readable storage media as claim 6 recites, wherein, based at least in part on broadcasting the expression data, the one or more instructions are executable by the one or more processors further to determine a presence of the second device within a predefined geolocation.

9. The one or more non-transitory computer-readable storage media as claim 6 recites, wherein the one or more instructions are executable by the one or more processors further to:
determine an occurrence of an event; and
broadcast the expression data to the one or more other devices based at least in part on the occurrence of the event.

10. The one or more non-transitory computer-readable storage media as claim 9 recites, wherein:
the event comprises a signal strength below a threshold; and
the service comprises a telecommunication service.

11. The one or more non-transitory computer-readable storage media as claim 6 recites, wherein the service comprises a secure service.

12. The one or more non-transitory computer-readable storage media as claim 6 recites, wherein receiving the profile comprises:
establishing a direct connection with the second device; and
receiving the profile from the second device via the direct connection.

13. The one or more non-transitory computer-readable storage media as claim 6 recites, wherein the profile is associated with one or more provisioning rules, and the one or more instructions are executable by the one or more processors further to terminate an association between the profile and the second eSIM based at least in part on the one or more provisioning rules.

14. The one or more non-transitory computer-readable storage media as claim 13 recites, wherein the one or more provisioning rules include at least one of:
- a length of time the profile is to be associated with the second eSIM;
- a geographic area within which the profile is to be associated with the second eSIM; or
- an amount of data that can be used in association with the profile.

15. A computer-implemented method comprising:
broadcasting, by a first device, expression data to one or more other devices including a second device;
sending, from the first device to the second device, a request for a profile associated with a first embedded subscriber identity module (eSIM) of the second device, the second device being a device of the one or more other devices;
receiving, by the first device from the second device, the profile;
storing the profile in one or more non-transitory storage media of the first device;
associating, by the first device, the profile with a second eSIM of the first device; and
accessing, by the first device, at least one service of a service provider based at least in part on the profile.

16. The computer-implemented method as claim 15 recites, wherein, based at least in part on broadcasting the expression data, and wherein the computer-implemented method further comprises:
determining a presence of the second device within a threshold distance of the first device; and
sending the request responsive to determining the presence of the second device within the threshold distance of the first device.

17. The computer-implemented method as claim 15 recites, wherein the service comprises a secure service.

18. The computer-implemented method as claim 15 recites, wherein the service comprises a telecommunication service.

19. The computer-implemented method as claim 15 recites, wherein receiving the profile comprises:
establishing a direct connection with the second device; and
receiving the profile from the second device via the direct connection.

20. The computer-implemented method as claim 15 recites, wherein the profile is associated with one or more provisioning rules, and wherein the computer-implemented method further comprises: terminating an association between the profile and the second eSIM based at least in part on the one or more provisioning rules.

* * * * *